(12) United States Patent
Xing

(10) Patent No.: US 12,457,591 B2
(45) Date of Patent: Oct. 28, 2025

(54) METHOD FOR REPORTING DIRECT CURRENT CARRIER LOCATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jinqiang Xing, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 392 days.

(21) Appl. No.: 18/090,919

(22) Filed: Dec. 29, 2022

(65) Prior Publication Data
US 2023/0224879 A1    Jul. 13, 2023

Related U.S. Application Data

(63) Continuation of application No. PCT/CN2020/130140, filed on Nov. 19, 2020.

(51) Int. Cl.
*H04W 72/0453* (2023.01)
*H04W 72/0457* (2023.01)
*H04W 72/21* (2023.01)

(52) U.S. Cl.
CPC ... *H04W 72/0453* (2013.01); *H04W 72/0457* (2023.01); *H04W 72/21* (2023.01)

(58) Field of Classification Search
CPC ..... H04L 5/0046; H04L 5/0048; H04L 5/001; H04L 5/00; H04L 5/0094; H04L 5/0098; H04L 5/0053; H04L 1/00; H04W 72/0453; H04W 72/04; H04W 72/0457; H04W 72/21
See application file for complete search history.

(56) References Cited

U.S. PATENT DOCUMENTS 10,999,118 B2 * 5/2021 Park ................. H04W 56/0015
11,848,881 B2 * 12/2023 Horn ..................... H04L 5/0007
(Continued)

FOREIGN PATENT DOCUMENTS

CN    101604161 A    12/2009
CN    103986686 A    8/2014
(Continued)

OTHER PUBLICATIONS

International Search Report and Written Opinion with English Translation for PCT Application PCT/CN2020/130140 mailed Aug. 19, 2021. (16 pages).
(Continued)

*Primary Examiner* — Brian T O Connor
(74) *Attorney, Agent, or Firm* — Young Basile Hanlon & MacFarlane, P.C.

(57) ABSTRACT

A method for direct-current (DC) carrier location reporting, a terminal device, and a network device are provided. The method includes the following. A terminal device determines at least one DC carrier location offset, where each of the at least one DC carrier location offset indicates a frequency offset for a DC carrier location used by the terminal device relative to a reference DC carrier location. The terminal device reports the at least one DC carrier location offset to a network device.

20 Claims, 6 Drawing Sheets

(56) References Cited

U.S. PATENT DOCUMENTS

| | | | |
|---|---|---|---|
| 12,170,988 B2* | 12/2024 | Wang | H04W 76/23 |
| 2019/0028315 A1* | 1/2019 | Park | H04W 56/0045 |
| 2019/0313394 A1* | 10/2019 | Kubota | H04L 5/001 |
| 2023/0131328 A1* | 4/2023 | Zhang | H04L 5/001 370/329 |

FOREIGN PATENT DOCUMENTS

| | | |
|---|---|---|
| CN | 108023715 A | 5/2018 |
| WO | 2018231005 A1 | 12/2018 |

OTHER PUBLICATIONS

RAN4, LS on additional DC location reporting for intra-band UL CA, 3GPP TSG-RAN WG4 Meeting # 96-e, R4-2011906, Aug. 17-28, 2020. (2 pages).
Ericsson, Corrections to 38.211, 3GPP TSG-RAN WG1 Meeting #94bis, R1-1810599, Oct. 8-12, 2018. (89 pages).
Qualcomm Incorporated, PT-RS Considerations, 3GPP TSG RAN WG1 Meeting #93, R1-1807605, May 21-25, 2018. (6 pages).
Nokia, Nokia Shanghai Bell, More on DC location reporting for Intra band UL CA, 3GPP TSG-RAN WG4 Meeting# 97- e, R4-2015212, Nov. 2-13, 2020. (5 pages).
Extended European Search Report for EP Application 20961941.0 mailed Nov. 28, 2023. (13 pages).

* cited by examiner

SINGLE TRANSMIT-CHAIN

MULTI-TRANSMIT-CHAIN

METHOD FOR REPORTING DIRECT CURRENT CARRIER LOCATION, TERMINAL DEVICE, AND NETWORK DEVICE

CROSS-REFERENCE TO RELATED APPLICATION(S)

This application is a continuation of International Application No. PCT/CN2020/130140, filed Nov. 19, 2020, the entire disclosure of which is here incorporated by reference.

TECHNICAL FIELD

Implementations of this disclosure relate to the field of communication, and specifically to a method for direct-current (DC) carrier location reporting, a terminal device, and a network device.

BACKGROUND

In a communication system, a terminal device can perform direct-current (DC) carrier location (referred to as "DC location" for short) reporting based on a configured bandwidth pan(s) (BWP) (also referred to as "bandwidth segment"). Supposing that one carrier is configured with four BWPs, the terminal device can report up to four DC locations to a network device.

In some scenarios, the terminal device may operate on multiple carriers. Each carrier can be configured with multiple BWPs, and each two BWPs can be used to determine one DC location. As a result, there will be a large quantity of potential DC locations. In this case, how to perform DC location reporting is a problem to be solved.

SUMMARY

In a first aspect, a method for DC carrier location reporting is provided. The method includes the following. A network device receives at least one DC carrier location offset transmitted by a terminal device, where each of the at least one DC carrier location offset indicates a frequency offset for a DC carrier location used by the terminal device relative to a reference DC carrier location. The network device determines, according to the reference DC carrier location and the at least one DC carrier location offset, the DC carrier location used by the terminal device.

In a second aspect, a network device is provided. The network device includes a processor and a memory. The memory is configured to store computer programs. The processor is configured to invoke and execute the computer programs stored in the memory, to perform the method described in the first aspect or in various implementations of the second aspect.

In a third aspect, a terminal device is provided. The terminal device includes a processor and a memory. The memory is configured to store computer programs. The processor is configured to invoke and execute the computer programs stored in the memory to: determine at least one DC carrier location offset, each of the at least one DC carrier location offset indicating a frequency offset for a DC carrier location used by the terminal device relative to a reference DC carrier location; and report the at least one DC carrier location offset to a network device.

DETAILED DESCRIPTION

Figure 1:
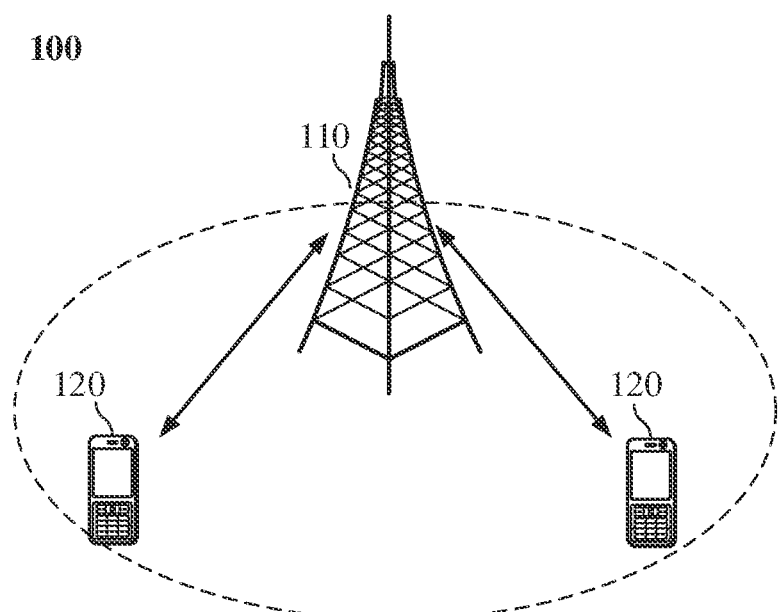
FIG. 1 is a schematic architectural diagram of a communication system provided in implementations of the disclosure.

The following will describe technical solutions of implementations of the disclosure with reference to the accompanying drawings in implementations of the disclosure. Apparently, Implementations described herein are merely some implementations, rather than all implementations, of the disclosure. Based on the implementations of the disclosure, all other implementations obtained by those of ordinary skill in the art without creative effort shall fall within the protection scope of the disclosure.

implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a $5^{th}$ generation (5G) system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

Optionally, the communication system in implementations of the disclosure is applicable to an unlicensed spectrum, and an unlicensed spectrum may be regarded as a shared spectrum. Or the communication system in implementations of the disclosure is applicable to a licensed spectrum, and a licensed spectrum may be regarded as a non-shared spectrum.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (gNB) in an NR network, a network device in a future evolved PLMN, or a network device in an NTN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (CEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100 to which implementations of the disclosure are applied. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in implementations of the disclosure may be a direct indication, may be, an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

In implementations of the disclosure, the "pre-defined" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In implementations of the disclosure, the "protocol" may refer to a communication standard protocol, which may include, for example, an LTE protocol, an NR protocol, and a protocol applied to a future communication system, and the disclosure is not limited in this regard.

For better understanding of implementations of the disclosure, the related art will be elaborated first.

Figure 2:
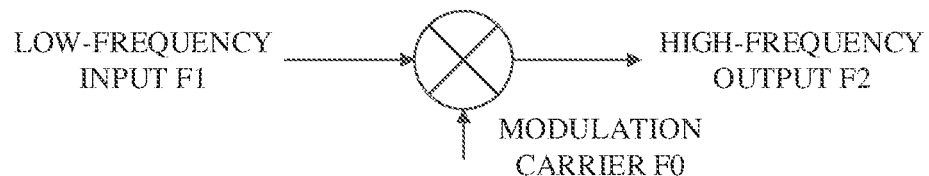
FIG. 2 is a schematic diagram illustrating signal modulation provided in implementations of the disclosure.

In wireless communication, modulation is a major way for frequency shifting of a signal. For example, as illustrated in FIG. 2, low-frequency input signal F1 and modulation carrier F0 can be subjected to a non-linear operation by a frequency mixer to generate a sum-frequency signal or a difference-frequency signal of the two signals, and then higher-order-frequency output signal F2 required is selected therefrom, thus completing frequency shifting from low frequency to high frequency, where F2=F1+F0.

Figure 3:
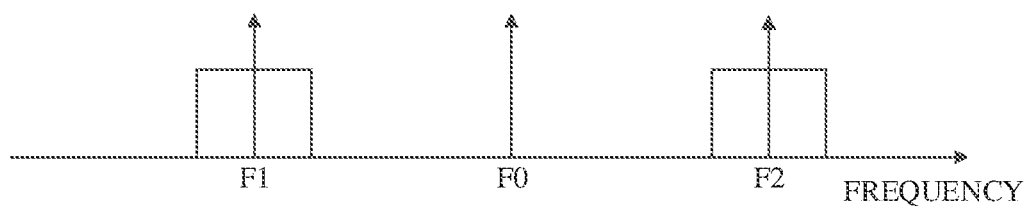
FIG. 3 is a schematic diagram illustrating a signal modulation spectrum provided in implementations of the disclosure.

For a wideband signal, a center frequency-point thereof is called a direct-current (DC) carrier location (also referred to as "DC location"), such as F1 and F2 illustrated in FIG. 3.

Figure 4:
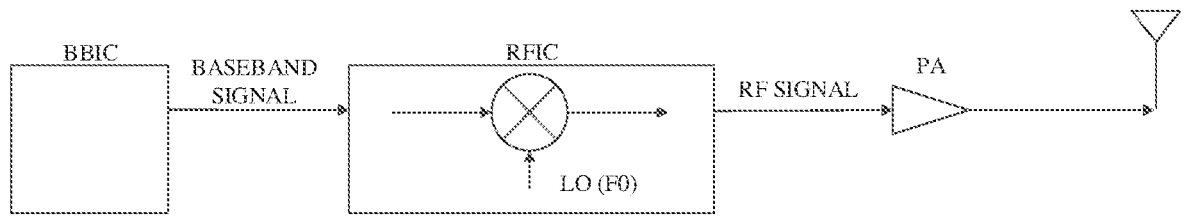
FIG. 4 is a schematic diagram illustrating an internal structure of a terminal device provided in implementations of the disclosure.

In actual implementation, signal modulation is implemented by a radio-frequency integrated chip (RFIC) of a terminal device. As illustrated in FIG. 4, a baseband IC (BBIC) of the terminal device inputs a baseband signal into the RFIC. Their in the RFIC, the input low-frequency baseband signal and a local oscillator (LO) signal of the RFIC (the frequency of the LO signal is F0) are subjected to frequency mixing to generate an RF signal, and the RF signal is amplified by a power amplifier (PA) and then transmitted via an antenna of the terminal device.

In orthogonal frequency-division multiplexing (OFDM) modulation, a DC location is usually prone to relatively strong signal-interference, and a carrier at the DC location needs to be removed at a receive end to improve a receive signal-to-noise ratio. Therefore, the receive end needs to know the exact DC location. The DC location is usually notified to the receive end by a transmit end. Taking uplink as an example, the terminal device needs to inform to a network device the exact DC location of a transmitted signal, such that the network device can remove a subcarrier at the DC location accurately.

In a new radio (NR) system, in order for power saving of the terminal, a concept of bandwidth part (BWP) is introduced. The network device usually configures a relatively small transmission bandwidth and a relatively small reception bandwidth for the terminal device, thereby reducing complexity of signal transmission and reception of the terminal device. For example, there may be multiple channels in a whole frequency-band. After the terminal device accesses one of the channels, the network device will configure up to four BWPs (only one BWP can be activated at a time), and the terminal device will operate in the active BWP in subsequent communication. The terminal device can perform DC location reporting based on the configured BWP(s). Supposing that one carrier is configured with four BWPs, the terminal device can report up to four DC locations to the network device.

Figure 5:
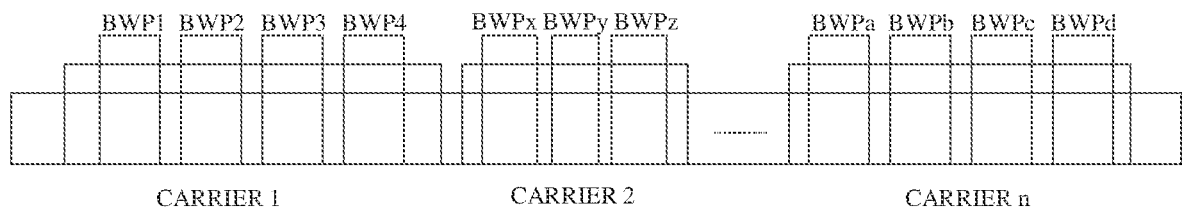
FIG. 5 is a schematic diagram illustrating bandwidth parts (BWP) in a carrier aggregation (CA) scenario.

In some scenarios, the terminal device may operate on multiple carriers, where each carrier can be configured with multiple BWPs. A DC location depends on a location(s) of an active BWP(s) on the multiple carriers. As illustrated in FIG. 5, carrier 1 is configured with BWP 1~BWP 4, carrier 2 is configured with BWP x~BWP z, . . . , and carrier n is configured with BWP a~BWP d, and accordingly, there are 4*3* . . . *4 potential BWP combinations. If a large quantity of carriers are configured, there will be a large quantity of potential BWP combinations. In this case, how to perform DC location reporting is a problem to be solved.

It should be understood that, in various implementations of the disclosure, magnitudes of sequence numbers of various operations are not intended to indicate an execution order, and the execution order of the operations should be determined by their functions and internal logic and shall not constitute any limitation on an implementation process of implementations of the disclosure.

It should be noted that, various implementations described in the disclosure and/or technical feature in various implementations can be arbitrarily combined without conflict, and technical solutions thus obtained shall also fall within the protection scope of the disclosure.

Figure 6:
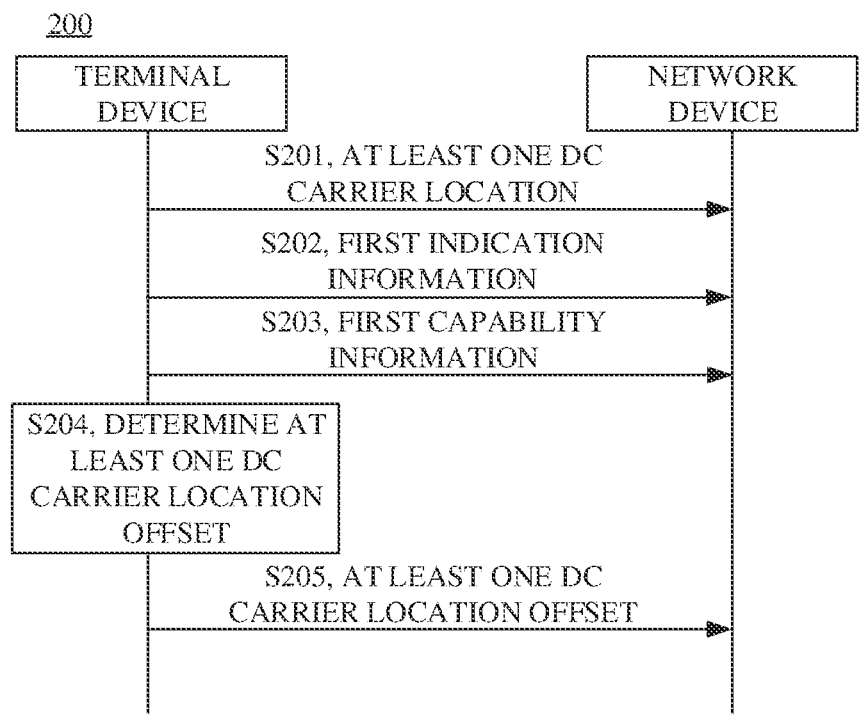
FIG. 6 is a schematic interaction diagram of a method for direct-current (DC) carrier location reporting provided in implementations of the disclosure.

FIG. 6 is a schematic interaction diagram of a method for DC carrier location reporting according to implementations of the disclosure. As illustrated in FIG. 6, the method 200 may include at least some of the following steps.

S204, a terminal device determines at least one DC carrier location offset.

S205, the terminal device reports the at least one DC carrier location offset to a network device.

In implementations of the disclosure, the DC carrier location offset indicates a frequency offset for a DC carrier location used by the terminal device relative to a reference DC carrier location.

It should be noted that, in implementations of the disclosure, the "DC carrier location" may also be referred to as a "DC location", and the two terms can be used interchangeably. The "DC carrier location offset" may also be referred to as a "DC offset", and the two terms can be used interchangeably. The "reference DC carrier location" may also be referred to as a "reference DC location", and the two terms can be used interchangeably.

It should be understood that, there is no limitation on the expression of the DC offset in implementations of the disclosure. The DC offset may be a positive value, a negative value, or zero.

As an example, the DC offset may be a specific frequency-offset value, such as 5 kilohertz (khz), 15 khz, etc.

As another example, the DC offset may be the quantity of subcarriers such as n subcarriers in a unit of 15 khz subcarrier spacing, where n may be a positive value, a negative value, or zero.

As another example, the DC offset may be the quantity of specific frequency intervals such as n frequency intervals in a unit of 100 khz, 5 khz, 15 khz, or 200 khz, where n may be a positive value, a negative value, or zero.

Optionally, in some implementations, if the terminal device does not transmit the at least one DC offset to the network device, the network device may consider that the DC location actually used by the terminal device is the reference DC location, and then perform interference cancellation according to the reference DC location.

In some implementations, the DC carrier location actually used by the terminal device is exactly the reference DC location. In this case, the terminal device does not need to transmit. the at least one DC offset to the network device.

In some other implementations, the DC carrier location actually used by the terminal device is different from the reference DC location. For example, in a multi-carrier scenario, the DC location for the terminal device depends on various factors. For instance, the DC location for the terminal device depends on a carrier with lowest frequency and a carrier with highest frequency, an active carrier with lowest frequency and an active carrier with highest frequency, a BWP with lowest frequency and a BWP with highest frequency, and an active BWP with lowest frequency and an active BWP with highest frequency. In addition, the DC location for the terminal device also depends on an intermediate carrier and an intermediate BWP in some scenarios, for example, where the DC location needs to be adjusted to avoid internal interference, etc. In this case, the terminal device can report the at least one DC offset to the network device, such that the network device can determine, according to the reference DC location and the at least one DC offset, the DC location actually used by the terminal device, and then perform interference cancellation according to the DC location actually used.

Optionally, in some implementations, the at least one DC offset may be transmitted in any uplink message or uplink signaling, such as an uplink radio resource control (RRC) message, media access control (MAC) signaling, a physical uplink control channel (PUCCH), etc. The disclosure is not limited in this regard.

In implementations of the disclosure, the terminal device can operate on multiple carriers simultaneously. For example, the terminal device is configured to operate in a CA mode (which may include, for example, intra-band contiguous CA and intra-band non-contiguous CA) or a DC mode.

In implementations of the disclosure, the terminal device may operate on the multiple carriers simultaneously with one transmit chain, or may operate on the multiple carriers simultaneously with multiple transmit chains. In other words, the terminal device may have a single-transmit-chain architecture or a multi-transmit-chain architecture, that is, the multiple carriers correspond to one transmit chain or correspond to multiple transmit chains.

In implementations of the disclosure, the transmit chain may be used for modulation and power amplification of a carrier signal. The transmit chain may include a PA and a frequency mixer. In some cases, a transmit-chain architecture may refer to an architecture where PA is used.

In implementations of the disclosure, the quantity of the reference DC carrier location may be one or multiple.

In some implementations, if the terminal device has a single-transmit, architecture, the quantity of the reference DC carrier location may be one.

Figure 7:
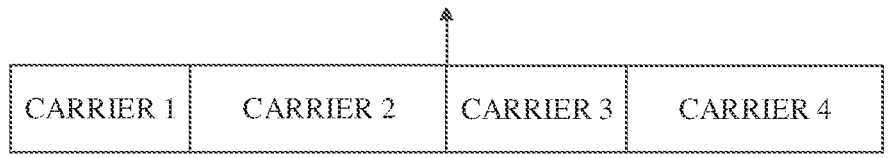
FIG. 7 to FIG. 12 are each a schematic diagram illustrating a reference DC location(s) according to implementations of the disclosure.

For example, as illustrated in FIG. 7, the terminal device is configured with carrier 1~carrier 4, where the four carriers correspond to one transmit chain, and then the quantity of the reference DC carrier location may be one.

In some other implementations, the terminal device has a multi-transmit-chain architecture. The quantity of the reference DC carrier location may be multiple, where each transmit chain corresponds to one reference DC carrier location. Alternatively, the quantity of the reference DC carrier location may be one, for example, multiple transmit chains correspond to one reference DC carrier location.

Figure 8:
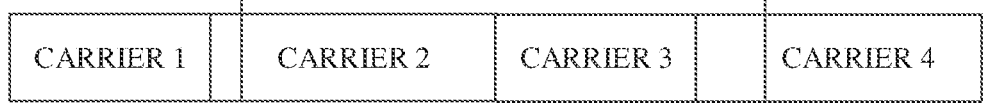

For example, as illustrated in FIG. 8, the terminal device is configured with carrier 1~carrier 4, where carrier 1 and carrier 2 correspond to transmit chain 1, and carrier 3 and carrier 4 correspond to transmit chain 2. Transmit chain 1 and transmit chain 2 may each correspond to a respective reference DC location, for example, transmit chain 1 corresponds to reference DC location 1, and transmit chain 2 corresponds to reference DC location 2.

In some implementations, the terminal device has a single-transmit-chain architecture. The quantity of the reference DC carrier location is one, the at least one DC carrier location offset includes one DC carrier location offset, and the reference DC carrier location and the DC carrier location offset are used for determining a DC carrier location for the single transmit chain.

In some other implementations, the terminal device has a multi-transmit-chain architecture. The at least one DC carrier location offset includes multiple DC carrier location offsets, each transmit chain corresponds to one DC carrier location offset, and each DC carrier location offset is a frequency offset relative to the same reference DC carrier location. For each transmit chain, the reference DC carrier location and a DC carrier location offset corresponding to the transmit chain are used for determining a DC carrier location for the transmit chain.

In some other implementations, the terminal device has a multi-transmit-chain architecture. Each transmit chain corresponds to one reference DC carrier location. The at least one DC carrier location offset includes multiple DC carrier location offsets, and each transmit chain corresponds to one DC carrier location offset. For each transmit chain, a reference DC carrier location and a DC carrier location offset corresponding to the transmit chain are used for determining a DC carrier location fir the transmit chain.

In some other implementations, the terminal device has a multi-transmit-chain architecture. Each transmit chain corresponds to one reference DC carrier location. The at least one DC carrier location offset includes one DC carrier location offset. For each transmit chain, a reference DC carrier location corresponding to the transmit chain and the DC carrier location offset are used for determining a DC carrier location for the transmit chain.

The following will take a single transmit chain as an example to elaborate indication of a reference DC location for the transmit chain. For a case of multiple transmit chains, a reference DC location for each of other transmit chains is indicated in a similar manner and will not be described in detail herein.

Optionally, in some implementations, the terminal device can determine at least one DC carrier location. The at least one DC carrier location may be pre-defined, or may be determined according to a configuration of the network device, or may be determined by the terminal device itself, and the disclosure is not limited in this regard.

Optionally, in some implementations, as illustrated in FIG. 6, the method 200 may further include the following.

S201, the terminal device reports the at least one DC location to the network device.

Optionally, in some implementations, the at least one DC carrier location may be transmitted in any uplink message or uplink signaling, such as an uplink RRC message, MAC signaling, a PUCCH, etc. The disclosure is not limited in this regard.

The reference DC carrier location may be a DC carrier location used for determining a DC carrier location offset among the at least one DC carrier location. The at least one DC carrier location may be regarded as a candidate reference DC carrier location(s), and the reference DC carrier location may be regarded as a target reference DC carrier location.

Optionally, the reference DC location may include some or all of the at least one DC carrier location.

In some implementations, the terminal device may report multiple DC locations to the network device, and indicate to the network device the reference DC location used for determining the DC offset.

In other words, the terminal device may report multiple reference DC locations to the network device, and indicate to the network device the target reference DC location used for determining the DC offset.

In some implementations, as illustrated in FIG. 6, the method 200 may further include the following.

S202, the terminal device transmits first indication information to the network device. The first indication information indicates the reference DC carrier location among the multiple DC carrier locations, that is, indicates which of the DC carrier locations is taken as the reference DC location.

As an example, the first indication information includes a first bitmap. The first bitmap includes multiple bits, where each of the multiple bits corresponds to one of the multiple DC carrier locations, and for each of the multiple bits, a value of the bit indicates whether a DC carrier location corresponding to the bit is the reference DC carrier location.

For example, a value "1" of a bit indicates that the DC carrier location corresponding to the bit is the reference DC carrier location, and a value "0" of the bit indicates that the DC carrier location corresponding to the bit is not the reference DC carrier location. If DC location 0~DC location 3 are reported by the terminal device, the first bitmap may include four bits, where the four bits each correspond to one DC location. If the first bitmap is "1000", it indicates that DC location 3 is the reference DC location.

Optionally, in some implementations, the first indication information is transmitted in any uplink message or uplink signaling, such as an uplink RRC message, MAC signaling, a PUCCH, etc. The disclosure is not limited in this regard.

Optionally, in some implementations, as illustrated in FIG. 6, the method further includes the following.

S203, the terminal device transmits first capability information to the network device, where the first capability information indicates whether the terminal device supports DC carrier location reporting in CA.

Optionally, in some implementations, the first capability information is transmitted in any uplink message or uplink signaling, such as an uplink RRC message, MAC signaling, a PUCCH, etc. The disclosure is not limited in this regard.

Optionally, the first capability information may indicate whether the terminal device supports DC location reporting in the related art, or supports DC location reporting in implementations of the disclosure. Or the first capability information may indicate whether the terminal device supports reporting that is on the basis of the reference DC location and the DC offset.

Optionally, in some implementations, the terminal device may indicate implicitly to the network device a DC carrier location taken as the reference DC carrier location among the multiple DC carrier locations.

For example, the terminal device may indicate implicitly the reference DC location by whether to transmit the first capability information or by the content indicated by the first capability information transmitted.

As an example, if the first capability information indicates that the terminal device supports DC carrier location reporting in CA, the reference DC carrier location is a first DC carrier location among the multiple DC carrier locations.

As another example, if the first capability information indicates that the terminal device does not support DC carrier location reporting in CA, the reference DC carrier location is a second DC carrier location among the multiple DC carrier locations, where the first DC carrier location is different from the second DC carrier location.

As another example, if the terminal device does not transmit indication information indicative of DC location reporting capability, the reference DC carrier location is a third DC carrier location among the multiple DC carrier locations.

As another example, if the terminal device transmits indication information indicative of DC location reporting capability, the reference DC carrier location is a fourth DC carrier location among the multiple DC carrier locations, where the third. DC carrier location is different from the fourth DC carrier location. Or when transmitted by the terminal device, the indication information indicative of DC location reporting capability implicitly indicates, by different contents of the indication information, different. DC carrier locations taken as the reference DC carrier location.

In some implementations, the terminal device determines at least one reference DC location according to first information. The first information includes at least one of: a frequency-band configuration for the terminal device, a carrier configuration for the terminal device, a BWP configuration for the terminal device, or an active-BWP configuration for the terminal device. The frequency-band configuration is used for configuring an operation frequency-band for the terminal device, the carrier configuration is used for configuring multiple carriers in the operation frequency-band, the BWP configuration is used for configuring multiple BWPs on each of the multiple carriers, and the active-BWP configuration is used for configuring an active BWP among the multiple BWPs.

Optionally, in implementations of the disclosure, the terminal device may determine by itself, determine according to an indication of the network device, or be pre-configured (i.e. by default) to determine the reference DC location according to the first information.

Optionally, the network device may use existing signaling to indicate to the terminal device a manner for determining the reference DC location, for example, use the frequency-band configuration, the carrier configuration, or the BWP configuration, etc. to configure for the terminal device the manner for determining the reference DC location. Or the network device may use new signaling to configure for the terminal device the manner for determining the reference DC location. The disclosure is not limited in this regard.

It should be understood that, in some implementations, the manner for determining the reference DC location is pre-defined. In this case, the network device can know the reference DC location used for the terminal device to determine the DC offset, without reporting of the reference DC location by the terminal device to the network device.

The following will describe in detail the manner for determining the reference DC location (that is, potential locations of the reference DC location) in connection with implementations.

Manner 1

In manner 1, the terminal device determines the reference DC location according to the frequency-band configuration.

In some implementations, the terminal device may determine that the reference DC location is a specific location in an operation frequency-band indicated by the frequency-band configuration, where the specific location may be pre-agreed.

As an example, the reference DC location includes a preset location in the operation frequency-band indicated by the frequency-band configuration. The preset location in the operation frequency-band may be, for example, a center frequency-point location in the operation frequency-band such as center frequency-point location DC1 illustrated in FIG. 9.

In this case, the DC location reported by the terminal device may not depend on the carrier configuration, the BWP configuration, and BWP activation.

Manner 2

In manner 2, the terminal device determines the reference DC location according to a specific carrier configuration for the terminal device.

In this case, the reference DC location reported by the terminal device may not depend on the BWP configuration and BWP activation.

Optionally, the specific carrier configuration may be any one of all carrier configurations for the terminal device, or may be a carrier configuration satisfying a specific condition such as a carrier configuration corresponding to a carrier with a minimum carrier identity (ID) or a carrier configuration corresponding to a carrier with a maximum carrier ID, etc.

In some implementations, the terminal device determines the reference DC location based on a first carrier. In this case, the reference DC location is a specific location in the first carrier. The specific location may be pre-agreed, for example, a center frequency-point location in the first carrier.

Figure 9:
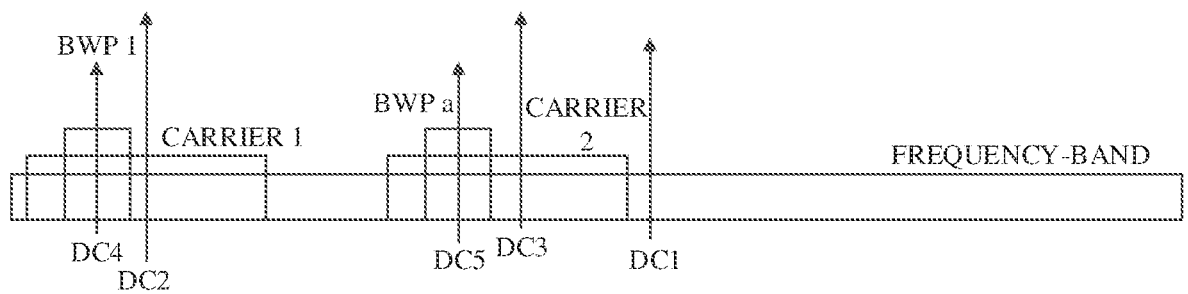

For example, as illustrated in FIG. 9, the terminal device is configured with carrier 1 and carrier 2. A target carrier used for determining the reference DC location may be carrier 1 or carrier 2, and accordingly, the reference DC location may be center frequency-point location DC2 in carrier 1, or may be center frequency-point location DC3 in carrier 2.

Optionally, which of the carrier configurations is to be used by the terminal device to determine the reference DC location may be pre-defined (or default), for example, a carrier configuration corresponding to a carrier with a minimum carrier ID is to be used by default; or may be indicated by the network device; or may be negotiated between the network device and the terminal device; or may be determined by the terminal device itself and then notified to the network device. For example, the terminal device may transmit second indication information to the network device, where the second indication information indicates a target carrier or target carrier configuration used for determining the reference DC location.

It should be understood that, the indication manner of the second indication information is not limited in the disclosure.

As an example, the second indication information includes a second bitmap. The second bitmap includes multiple bits, where each of the multiple bits corresponds to one of multiple carriers, and for each of the multiple bits, a value of the bit indicates whether the reference DC carrier location is in a carrier corresponding to the bit. For example, the value "1" indicates that the DC carrier location is in the carrier corresponding to the bit, and the value "0" indicates that the DC carrier location is not in the carrier corresponding to the bit.

For example, the terminal device is configured with eight carrier configurations. Then the first bitmap may include eight bits (bit 7~bit 0) which correspond to carrier 7~carrier 0 respectively. If the reference DC location is in carrier 1, bit 1 may be set to "1" while other bits may be set to "0", which indicates that the reference DC location is in carrier 1.

As another example, the second indication information includes multiple bits, where different values of the multiple bits indicate a carrier that the reference DC location is in.

For example, the terminal device is configured with eight carrier configurations. Then the second indication information may include three bits, where the eight values of the three bits correspond to the eight carrier configurations. Exemplarily, if the reference DC location is in a $4^{th}$ carrier, the three bits can be set to "100".

Optionally, in some implementations, the second indication information may be transmitted in any uplink message or uplink signaling such as an uplink RRC message, and the disclosure is not limited in this regard.

Manner 3

In manner 3, the terminal device determines the reference DC location according specific active-BWP configuration.

In this case, the reference DC location reported by the terminal device depends on BWP configuration and BWP activation.

Optionally, the specific active-BWP configuration may be any BWP configuration among all active-BWP configurations for the terminal device, or may be a BWP configuration satisfying a specific condition such as a BWP configuration corresponding to a BWP with a minimum BWP ID or a BWP configuration corresponding to a BWP with a maximum BWP ID.

In some implementations, the terminal device determines the reference DC location according to a first BWP. In this case, the reference DC location is a specific location in the first BWP. The specific location may be pre-agreed, for example, a center frequency-point location in the first BWP.

For example, as illustrated in FIG. 9, the terminal device is configured with carrier 1 and carrier 2, an active BWP on carrier 1 is BWP 1, an active BWP on carrier 2 is BWP a, and accordingly, a target BWP used for determining the reference DC location may be BWP 1 or BWP a. In this case, the reference DC location may be center frequency-point location DC4 in BWP 1, or may be center frequency-point location DC5 in BWP a.

Optionally, which of the active-BWP configurations is to be used by the terminal device to determine the reference DC location may be pre-defined (or default), for example, a BWP configuration corresponding to a BWP with a minimum BWP ID among all active BWPs is to be used by default; or may be indicated by the network device; or may be negotiated between the network device and the terminal device; or may be determined by the terminal device itself and then notified to the network device. For example, the terminal device may transmit third indication information to the network device, where the third indication information indicates a target BWP or target BWP configuration used for determining the reference DC location.

It should be understood that, the indication manner of the third indication information is not limited in the disclosure.

As an example, the third indication information includes a third bitmap. The third bitmap includes multiple bits, where each of the multiple bits corresponds to one of active BWPs on multiple carriers, and for each of the multiple bits, a value of the bit, indicates whether the reference DC location is in an active BWP corresponding to the bit.

For example, the terminal device is configured with four active-MVP configurations. Then the third bitmap may include four bits (bit 3~bit 0) which correspond to the four active-BWP configurations respectively (or correspond to four carriers respectively). If the reference DC location is in an active MVP on a $2^{nd}$ carrier, bit 1 may be set to "1" while other bits may be set to "0", which indicates that the reference DC location is in an active BWP on carrier 2.

As another example, the third indication information includes multiple bits, where different values of the multiple bits indicate a BWP that the reference DC location is in.

For example, the terminal device is configured with four BWP configurations. Then the third indication information may include two bits, where the four values of the two bits correspond to the four BWP configurations. Exemplarily, if the reference DC location is in an active BWP on a $2^{nd}$ carrier, the 2 bits can be set to "01".

Optionally, in some implementations, the third indication information may be transmitted in an uplink RRC message or transmitted in other uplink messages or signaling, and the disclosure is not limited in this regard.

Manner 4

In manner 4, the terminal device determines the reference DC location according to all carrier configurations.

In this case, the reference DC location reported by the terminal device depends on the carrier configuration rather than the IMP configuration and BWP activation.

In some implementations, the terminal device may determine the reference DC location according to a band range occupied by multiple carriers.

It should be understood that, in implementations of the disclosure, the band range occupied by the multiple carriers may be continuous or discrete. In some implementations, the band range occupied by the multiple carriers may be a union set of band ranges occupied by the multiple carriers, or may be a band range from the lowest frequency-point to the highest frequency-point occupied by the multiple carriers. In other words, the band range occupied by the multiple carriers may be multiple discrete band sub-ranges, or may be one continuous band range.

As an example, the reference DC location includes a preset location in a first band-range, where the first band-range is the band range occupied by the multiple carriers.

Figure 10:
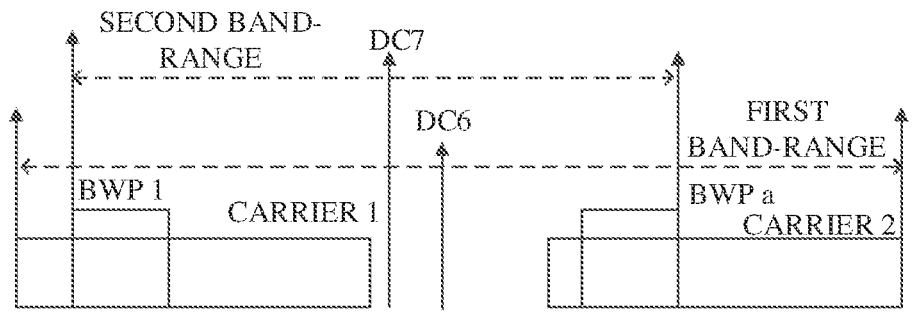

In one case, the first band-range is one continuous band range. In this scenario, the preset location in the first band-range may be a center frequency-point location in the first band-range. For example, as illustrated in FIG. 10, the terminal device is configured with carrier 1 and carrier 2, the first band-range is a band range from the lowest, frequency-point to the highest frequency-point occupied by carrier 1 and carrier 2, and the reference DC location may be center frequency-point location DC6 in the first band-range.

In another case, the first band-range includes multiple discrete band sub-ranges. In this scenario, the preset location in the first band-range may include a center frequency-point location in each of the multiple discrete band sub-ranges.

Manner 5

In manner 5, the terminal device determines the reference DC location according to active-BWP configurations on all carriers.

In this case, the reference DC location reported by the terminal device depends on BWP activation.

In some implementations, the terminal device may determine the reference DC location according to a band range occupied by active BWPs on multiple carriers.

Similar to the band range occupied by the multiple carriers, the band range occupied by the active BWPs on the multiple carriers may be multiple discrete band sub-ranges, or may be one continuous band range such as a band range from the lowest frequency-point to the highest frequency-point occupied by all the active MVPs on the multiple carriers.

As an example, the reference DC location includes a preset location in a second band-range, where the second band-range is the band range occupied by the active BWPs on the multiple carriers.

In one case, the second band-range is one continuous band range. In this scenario, the preset location in the second band-range may be a center frequency-point location in the second band-range. For example, as illustrated in FIG. 10, the terminal device is configured with carrier 1 and carrier 2, an active BWP on carrier 1 is BWP 1, an active BWP on carrier 2 is BWP a, the second band-range is a band range from the lowest frequency-point to the highest frequency-point occupied by BWP 1 and BWP a, and the reference DC location may be center frequency-point location DC7 in the second band-range.

In another case, the second band-range includes multiple discrete band sub-ranges. In this scenario, the preset location in the second band-range may include a center frequency-point location in each of the multiple discrete band sub-ranges, Manner 6

In manner 6, the terminal device determines the reference DC location according to all BWP configurations on a specific carrier.

In this case, the reference DC location reported by the terminal device depends on the BWP configuration rather than BWP activation.

Optionally, the specific carrier may be any one of all carriers for the terminal device, or may be a carrier satisfying a specific condition such as a carrier with a minimum carrier ID or a carrier with a maximum carrier ID.

Optionally, on which carrier all BWP configurations are to be used by the terminal device to determine the reference DC location may be pre-defined (or default), for example, BWP configurations on a carrier with a minimum carrier ID are to be used by default; or may be indicated by the network device; or may be negotiated between the network device and the terminal device; or may be determined by the terminal device itself and then notified to the network device. For example, the terminal device may transmit third indication information to the network device, where the third indication information indicates a target carrier used for determining the reference DC location. For the indication manner of the third indication information, reference can be made to relevant elaborations of the second indication information in manner 2, which will not be described in detail again herein for the sake of brevity.

In some implementations, the terminal device may determine the reference DC location according to a band range occupied by all BWPs on the specific carrier.

Similar to the band ranges in manner 4 and manner 5, the band range occupied by all the BWPs on the specific carrier may be multiple discrete band sub-ranges, or may be one continuous band range such as a band range from the lowest frequency-point to the highest frequency-point occupied by all the BWPs on the specific carrier.

As an example, the reference DC location includes a preset location in a third band-range, where the third band-range is a band range occupied by multiple BWPs configured on a second carrier among multiple carriers.

Figure 11:
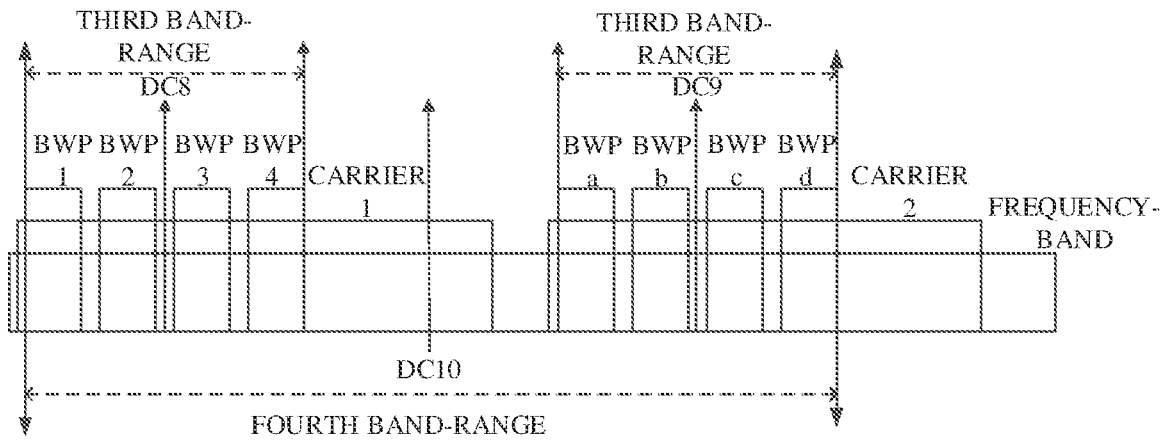

In one case, the third band-range is one continuous band range. In this scenario, the preset location in the third band-range may be a center frequency-point location in the third band-range. For example, as illustrated in FIG. 11, the terminal device is configured with carrier 1 and carrier 2, where carrier 1 is configured with BWP 1~BWP 4, and carrier 2 is configured with BWP a~BWP d. Then the third band-range may be a band range from the lowest frequency-point to the highest frequency-point occupied by multiple BWPs on carrier 1, or may be a band range from the lowest frequency-point to the highest frequency-point occupied by multiple BWPs on carrier 2. Accordingly, the reference DC location may be center frequency-point location DC8 in the band range occupied by the multiple BWPs on carrier 1, or may be center frequency-point location DC9 in the band range occupied by the multiple BWPs on carrier 2.

In another case, the third band-range includes multiple discrete band sub-ranges. In this scenario, the preset location in the third band-range includes a center frequency-point location in each of the multiple discrete band sub-ranges.

Manner 7

In manner 7, the terminal device determines the reference DC location according to all BWP configurations on multiple carriers.

In this case, the reference DC location reported by the terminal device depends on the BWP configuration rather than BWP activation.

In some implementations, the terminal device may determine the reference DC location according to a band range occupied by all BWPs on multiple carriers for the terminal device.

Similar to the band ranges in manner 4~manner 6, the hand range occupied by all the BWPs on the multiple carriers may be multiple discrete hand sub-ranges, or may be one continuous band range such as a band range from the lowest frequency-point to the highest frequency-point occupied by all the BWPs on the multiple carriers.

As an example, the reference DC location includes a preset location in a fourth band-range, where the fourth band-range is a band range occupied by multiple BWP's configured on the multiple carriers.

In one case, the fourth band-range is one continuous band range. In this scenario, the preset location in the fourth band-range may be a center frequency-point location in the fourth band-range. For example, as illustrated in FIG. 11, the terminal device is configured with carrier 1 and carrier 2, where carrier 1 is configured with BWP 1~BWP 4, and carrier 2 is configured with BWP a~BWP d. Then the fourth band-range may be a band range from the lowest frequency-point to the highest frequency-point occupied by BWP 1~BWP 4 and BWP a~BWP d. Accordingly, the reference DC location may be center frequency-point location DC10 in the fourth band-range.

In another case, the fourth band-range includes multiple discrete band sub-ranges. In this scenario, the preset location in the fourth band-range may include a center frequency-point location in each of the multiple discrete band sub-ranges.

Manner 8

In manner 8, the terminal device may determine the reference DC location to be a specific frequency-point location.

For example, the specific frequency-point location may be any frequency-point location in the operation frequency-band, or any frequency-point location in an active BWP, or any frequency-point location in a carrier.

Manner 9

In manner 9, the terminal device can determine the reference DC location according to a first carrier and a second carrier in a first carrier-set, where the first carrier has the lowest frequency in the first carrier-set, and the second carrier has the highest frequency in the first carrier-set.

Example 1: the first carrier-set includes multiple uplink carriers configured by the network device.

Figure 12:
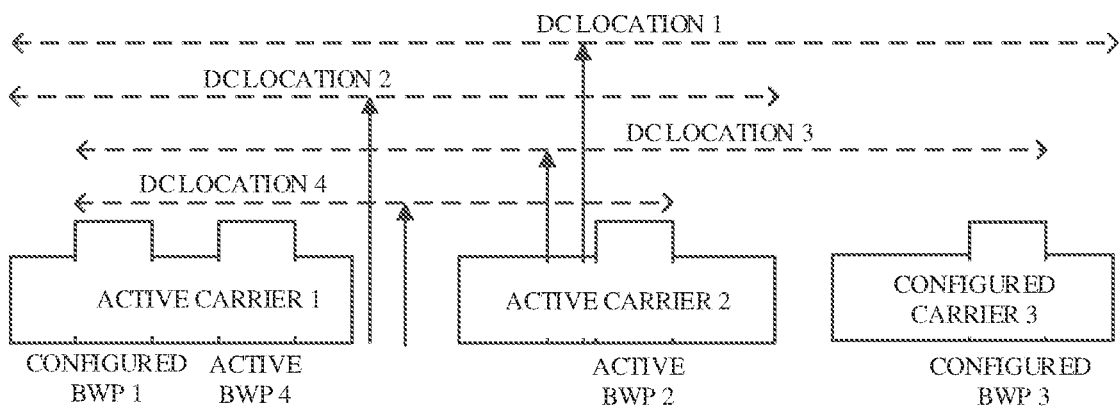

For instance, as illustrated in FIG. 12, the terminal device is configured with uplink carrier 1~uplink carrier 3, where carrier 1 has the lowest frequency, and carrier 3 has the highest frequency. Accordingly, the reference DC location may be a specific location between uplink carrier 1 and uplink carrier 3, such as center frequency location "DC location 1".

Example 2: the first carrier-set includes multiple uplink carriers configured and activated by the network device.

For instance, as illustrated in FIG. 12, the terminal device is configured with uplink carrier 1~uplink carrier 3. The activated uplink carriers are uplink carrier 1 and uplink carrier 2, where carrier 1 is a configured and activated uplink carrier with lowest frequency, and carrier 2 is a configured and activated uplink carrier with highest frequency. Accordingly, the reference DC location may be a specific location between uplink carrier 1 and uplink carrier 2, such as center frequency location "DC location 2".

Optionally, in example 1 and example 2 above, the DC location is unshared by uplink transmission and downlink reception of the terminal device. In other words, a separate DC location is used for each of uplink transmission and downlink reception of the terminal device. By using separate DC locations for uplink and downlink, it is beneficial to avoiding impact of downlink CA on an uplink DC location.

Example 3: the first carrier-set includes multiple uplink carriers configured by the network device, and multiple downlink carriers configured by the network device.

Example 4: the first carrier-set includes multiple uplink carriers configured and activated by the network device, and multiple downlink carriers configured and activated by the network device.

Optionally, in example 3 and example 4 above, the DC location is shared by uplink transmission and downlink reception of the terminal device. In this case, it is necessary to take into consideration impact of downlink carriers when determining an uplink DC location.

Manner 10

In manner 10, the terminal device can determine the reference DC location according to a first BWP and a second BWP in a first BWP-set for the terminal device, where the first BWP has the lowest frequency in the first BWP-set, and the second BWP has the highest frequency in the first BWP-set.

Example 1: the first BWP-set includes all uplink BWPs configured by the network device.

For instance, as illustrated in FIG. 12, the terminal device is configured with uplink carrier 1~uplink carrier 3, where uplink carrier 1 is configured with BWP 1 and BWP 4, uplink carrier 2 is configured with BWP 2, and uplink carrier 3 is configured with BWP 3. Among all the BWPs configured for the terminal device, BWP 1 has the lowest frequency, and BWP 3 has the highest frequency. Accordingly, the reference DC location may be a specific location between BWP 1 and BWP 3, such as center frequency location "DC location 3".

Example 2: the first BWP-set includes all uplink BWPs configured and activated by the network device.

For instance, as illustrated in FIG. 12, the terminal device is configured with uplink carrier 1~uplink carrier 3. Uplink carrier 1 is configured with BWP 1 and BWP 4, where BWP 4 is activated; uplink carrier 2 is configured with BWP 2 that is activated; and uplink carrier 3 is configured with BWP 3 that is activated. Among all the activated BWPs for the terminal device, BWP 4 has the lowest frequency, and BWP 2 has the highest frequency. Accordingly, the reference DC location may be a specific location between BWP 4 and BWP2, such as center frequency location "DC location 4".

Optionally, in example 1 and example 2 above, the DC location is unshared by uplink transmission and downlink reception of the terminal device. In other words, a separate DC location is used for each of uplink transmission and downlink reception of the terminal device. By using separate DC locations for uplink and downlink, it is beneficial to avoiding impact of downlink CA on an uplink DC location.

Example 3: the first BWP-set includes all uplink BWPs configured by the network device, and all downlink BWPs configured by the network device.

Example 4: the first BWP-set includes all uplink BWPs configured and activated by the network device, and all downlink BWPs configured by the network device.

Optionally, in example 3 and example 4 above, the DC location is shared by uplink transmission and downlink reception of the terminal device. In this case, it is necessary to take into consideration impact of downlink carriers when determining an uplink DC location.

It should be understood that, the above manners for determining the reference DC location are merely examples. In other implementations, the reference DC location may also be determined according to other frequency-point information, and the disclosure is not limited in this regard.

In implementations of the disclosure, the terminal device may report to the network device the reference. DC location that is determined in at least one of manner 1~manner 10 described above.

As can be seen, the terminal device performs DC location reporting based on the reference DC location as well as the DC offset. In this way, if the DC location actually used is the reference DC location, the terminal device does not need to perform DC location reporting. If the DC location actually used is adjusted, the terminal device can report only a frequency offset for the adjusted DC location relative to the reference DC location. As such, it is possible to reduce signaling overhead.

Method implementations of the disclosure have been described in detail above with reference to FIG. 6 to FIG. 12. The following will elaborate apparatus implementations of the disclosure with reference to FIG. 13 to FIG. 17. It should be understood that, apparatus implementations and method implementations correspond to each other. For similar elaborations, reference can be made to the method implementations.

Figure 13:
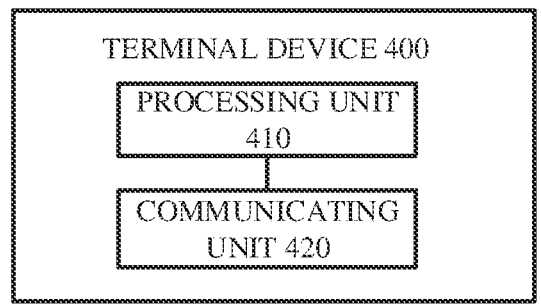
FIG. 13 is a schematic block diagram of a terminal device provided in implementations of the disclosure.

FIG. 13 is a schematic block diagram of a terminal device 400 according to implementations of the disclosure. As illustrated in FIG. 13, the terminal device 400 includes a processing unit 410 and a communicating unit 420. The processing unit 410 is configured to determine at least one DC carrier location offset, where each of the at least one DC carrier location offset indicates a frequency offset for a DC carrier location used by the terminal device relative to a reference DC carrier location. The communicating unit 420 is configured to report the at least one DC carrier location offset to a network device.

Optionally, in some implementations, each of the at least one DC carrier location offset is a specific frequency-offset value, or each of the at least one DC carrier location offset is a quantity of specific frequency intervals, or each of the at least one DC carrier location offset is a quantity of subcarriers.

Optionally, in some implementations, the at least one DC carrier location offset is transmitted in at least one of RRC signaling, MAC signaling, or a PUCCH.

Optionally, in some implementations, multiple carriers configured for the terminal device correspond to one transmit chain, a quantity of the reference DC carrier location is one, the at least one DC carrier location offset includes one DC carrier location offset, and the reference DC carrier location and the DC carrier location offset are used for determining a DC carrier location for the transmit chain.

Optionally, in some implementations, multiple carriers configured for the terminal device correspond to multiple transmit chains, a quantity of the reference DC carrier location is one, the at least one DC carrier location offset includes multiple DC carrier location offsets, each of the multiple transmit chains corresponds to one DC carrier location offset, each DC carrier location offset is a frequency offset relative to the reference DC carrier location, and for each of the multiple transmit chains, the reference DC carrier location and a DC carrier location offset corresponding to the transmit chain are used for determining a DC carrier location for the transmit chain. Or multiple carriers configured for the terminal device correspond to multiple transmit chains, a quantity of the reference DC carrier location is multiple, each of the multiple transmit chains corresponds to one reference DC carrier location; the at least one DC carrier location offset includes multiple DC carrier location offsets, each of the multiple transmit chains corresponds to one DC carrier location offset; and for each of the multiple transmit chains, a reference DC carrier location and a DC carrier location offset corresponding to the transmit chain are used for determining a DC carrier location for the transmit chain.

Optionally, in some implementations, the reference DC carrier location is determined according to at least one of: a frequency-band configuration for the terminal device, a carrier configuration for the terminal device, a BWP configuration for the terminal device, or an active-BWP configuration for the terminal device. The frequency-band configuration is used for configuring an operation frequency-band for the terminal device, the carrier configuration is used for configuring multiple carriers in the operation frequency-band, the BWP configuration is used for configuring multiple BWPs on each of the multiple carriers, and the active-BWP configuration is used for configuring an active BWP among the multiple BWPs.

Optionally, in some implementations, the reference DC carrier location is determined according to a first carrier and a second carrier in a first carrier-set for the terminal device, the first carrier has the lowest frequency in the first carrier-set, and the second carrier has the highest frequency in the first carrier-set.

Optionally, the first carrier-set includes multiple uplink carriers configured by the network device or the first carrier-set includes multiple uplink carriers configured and activated by the network device.

Optionally, the DC carrier location is unshared by uplink transmission and downlink reception of the terminal device.

Optionally, in some implementations, the first carrier-set includes multiple uplink carriers configured by the network device, and multiple downlink carriers configured by the network device. Or the first carrier-set includes multiple uplink carriers configured and activated by the network device, and multiple downlink carriers configured and activated by the network device.

Optionally, in some implementations, the DC carrier location is shared by uplink transmission and downlink reception of the terminal device.

Optionally, in some implementations, the reference DC carrier location is determined according to a first BWP and a second BWP in a first BWP-set for the terminal device, the first BWP has the lowest frequency in the first BWP-set, and the second BWP has the highest frequency in the first BWP-set.

Optionally, the first BWP-set includes all uplink BWPs configured by the network device, or the first BWP-set includes all uplink BWPs configured and activated by the network device.

Optionally, the DC carrier location is unshared by uplink transmission and downlink reception of the terminal device.

Optionally, in some implementations, the first BWP-set includes all uplink BWPs configured by the network device, and all downlink BWPs configured by the network device. Or the first BWP-set includes all uplink BWPs configured and activated by the network device, and all downlink MVPs configured by the network device.

Optionally, in some implementations, the DC carrier location is shared by uplink transmission and downlink reception of the terminal device.

Optionally, in some implementations, the reference DC carrier location includes at least one specific DC carrier location.

Optionally, in some implementations, the communicating unit 420 is further configured to transmit first indication information to the network device, where the first indication information indicates the reference DC carrier location among multiple DC carrier locations.

Optionally, in some implementations, the first indication information includes a first bitmap, the first bitmap includes multiple bits, each of the multiple bits corresponds to one of the multiple DC carrier locations, and for each of the multiple bits, a value of the bit indicates whether a DC carrier location corresponding to the bit is the reference DC carrier location.

Optionally, in some implementations, the first indication information is transmitted in at least one of: RRC signaling, MAC signaling, or a PUCCH.

Optionally, in some implementations, the communicating unit 420 is further configured to transmit first capability information to the network device, where the first capability information indicates whether the terminal device supports DC carrier location reporting in CA.

Optionally, in some implementations, the first capability information is transmitted in at least one of: RRC signaling, MAC signaling, or a PUCCH.

Optionally, in some implementations, the first capability information is further used for determining the reference DC carrier location among the multiple DC carrier locations.

Optionally, in some implementations, when the first capability information indicates that the terminal device supports DC carrier location reporting in CA, the reference DC carrier location is a first DC carrier location among the multiple DC carrier locations. Or when the first capability information indicates that the terminal device does not support DC carrier location reporting in CA, the reference DC carrier location is a second DC carrier location among the multiple DC carrier locations, where the first DC carrier location is different from the second DC carrier location.

Optionally, in some implementations, the multiple DC carrier locations are pre-defined, or reported to the network device by the terminal device.

Optionally, in some implementations, the communicating unit above may be a communication interface or a transceiver, or may be an input-output interface of a communication chip or system-on-chip (SOC). The processing unit above may be one or more processors.

It should be understood that, the terminal device 400 according to implementations of the disclosure may correspond to the terminal device in the method implementations of the disclosure, and the above and other operations and/or functions of various units of the terminal device 400 are respectively intended for implementing corresponding operations of the terminal device in the method 200 illustrated in FIG. 6 to FIG. 12, which will not be repeated herein for the sake of simplicity.

Figure 14:
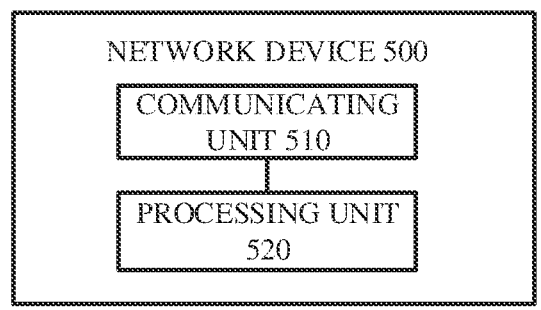
FIG. 14 is a schematic block diagram of a network device provided in implementations of the disclosure.

FIG. 14 is a schematic block diagram of a network device according to implementations of the disclosure. The network device 500 illustrated in FIG. 14 includes a communicating unit 510 and a processing unit 520. The communicating unit 510 is configured to receive at least one DC carrier location offset transmitted by a terminal device, where each of the at least one DC carrier location offset indicates a frequency offset for a DC carrier location used by the terminal device relative to a reference DC carrier location. The processing unit 520 is configured to determine, according to the reference DC carrier location and the at least one DC carrier location offset, the DC carrier location used by the terminal device.

Optionally, in some implementations, each of the at least one DC carrier location offset is a specific frequency-offset value, or each of the at least one DC carrier location offset is a quantity of specific frequency intervals, or each of the at least one DC carrier location offset is a quantity of subcarriers.

Optionally, in some implementations, the at least one DC carrier location offset is transmitted in at least one of: RRC signaling, MAC signaling, or a PUCCH.

Optionally, in some implementations, multiple carriers configured for the terminal device correspond to one transmit chain, a quantity of the reference DC carrier location is one, the at least one DC carrier location offset includes one DC carrier location offset, and the reference DC carrier location and the DC carrier location offset are used for determining a DC carrier location for the transmit chain.

Optionally, in some implementations, multiple carriers configured for the terminal device correspond to multiple transmit chains, a quantity of the reference DC carrier location is one, the at least one DC carrier location offset includes multiple DC carrier location offsets, each of the multiple transmit chains corresponds to one DC carrier location offset, each DC carrier location offset is a frequency offset relative to the reference DC carrier location, and for each of the multiple transmit chains, the reference DC carrier location and a DC carrier location offset corresponding to the transmit chain are used for determining a DC carrier location for the transmit chain. Or multiple carriers configured for the terminal device correspond to multiple transmit chains, a quantity of the reference DC carrier location is multiple, each of the multiple transmit chains corresponds to one reference DC carrier location; the at least one DC carrier location offset includes multiple DC carrier location offsets, each of the multiple transmit chains corresponds to one DC carrier location offset; and for each of the multiple transmit chains, a reference DC carrier location and a DC carrier location offset corresponding to the transmit chain are used for determining a DC carrier location for the transmit chain.

Optionally, in some implementations, the reference DC carrier location is determined according to at least one of: a frequency-band configuration for the terminal device, a carrier configuration for the terminal device, a BWP configuration for the terminal device, or an active-BWP configuration for the terminal device. The frequency-band configuration is used for configuring an operation frequency-band for the terminal device, the carrier configuration is used for configuring multiple carriers in the operation frequency-band, the BWP configuration is used for configuring multiple BWPs on each of the multiple carriers, and the active-BWP configuration is used for configuring an active BWP among the multiple BWPs.

Optionally, in some implementations, the reference DC carrier location is determined according to a first carrier and a second carrier in a first carrier-set for the terminal device, the first carrier has the lowest frequency in the first carrier-set, and the second carrier has the highest frequency in the first carrier-set.

Optionally, the first carrier-set includes multiple uplink carriers configured by the network device, or the first carrier-set includes multiple uplink carriers configured and activated by the network device.

Optionally, the DC carrier location is unshaved by uplink transmission and downlink reception of the terminal device.

Optionally, in some implementations, the first carrier-set includes multiple uplink carriers configured by the network device, and multiple downlink carriers configured by the network device. Or the first carrier-set includes multiple uplink carriers configured and activated by the network device, and multiple downlink carriers configured and activated by the network device.

Optionally, in some implementations, the DC carrier location is shared by uplink transmission and downlink reception of the terminal device.

Optionally, in some implementations, the reference DC carrier location is determined according to a first BWP and a second BWP in a first BWP-set for the terminal device, the first BWP has the lowest frequency in the first BWP-set, and the second BWP has the highest frequency in the first BWP-set.

Optionally, the first BWP-set includes all uplink BWPs configured by the network device, or the first BWP-set includes all uplink BWPs configured and activated by the network device.

Optionally, the DC carrier location is unshared by uplink transmission and downlink reception of the terminal device.

Optionally, in some implementations, the first BWP-set includes all uplink BWPs configured by the network device, and all downlink BWPs configured by the network device. Or the first BWP-set includes all uplink BWPs configured and activated by the network device, and all downlink BWPs configured by the network device.

Optionally, in some implementations, the DC carrier location is shared by uplink transmission and downlink reception of the terminal device.

Optionally, in some implementations, the reference DC carrier location includes at least one specific DC carrier location.

Optionally, in some implementations, the communicating unit 510 is further configured to receive first indication information transmitted by the terminal device, where the first indication information indicates the reference DC carrier location among multiple DC carrier locations.

Optionally, in some implementations, the first indication information includes a first bitmap, the first bitmap includes multiple bits, each of the multiple bits corresponds to one of the multiple DC carrier locations, and for each of the multiple bits, a value of the bit indicates whether a DC carrier location corresponding to the bit is the reference DC carrier location.

Optionally, in some implementations, the first indication information is transmitted in at least one of: RRC signaling, MAC signaling, or a PUCCH.

Optionally, in some implementations, the communicating unit 510 is further configured to receive first capability information transmitted by the terminal device, where the first capability information indicates whether the terminal device supports DC carrier location reporting in CA.

Optionally, in some implementations, the first capability information is transmitted in at least one of: RRC signaling, MAC signaling, or a PUCCH.

Optionally, in some implementations, the first capability information is further used for determining the reference DC carrier location among the multiple DC carrier locations.

Optionally, in some implementations, when the first capability information indicates that the terminal device supports DC carrier location reporting in CA, the reference DC carrier location is a first DC carrier location among the multiple DC carrier locations. Or when the first capability information indicates that the terminal device does not support DC carrier location reporting in CA, the reference DC carrier location is a second DC carrier location among the multiple DC carrier locations, where the first DC carrier location is different from the second DC carrier location.

Optionally, in some implementations, the multiple DC carrier locations are pre-defined, or reported to the network device by the terminal device.

Optionally, in some implementations, the communicating unit above may be a communication interface or a transceiver, or may be an input-output interface of a communication chip or SOC. The processing unit above may be one or more processors.

It should be understood that, the network device 500 according to implementations of the disclosure may correspond to the network device in the method implementations of the disclosure, and the above and other operations and/or functions of various units of the network device 500 are respectively intended for implementing corresponding operations of the network device in the method 200 illustrated in FIG. 6 to FIG. 12, which will not be repeated herein for the sake of simplicity.

Figure 15:
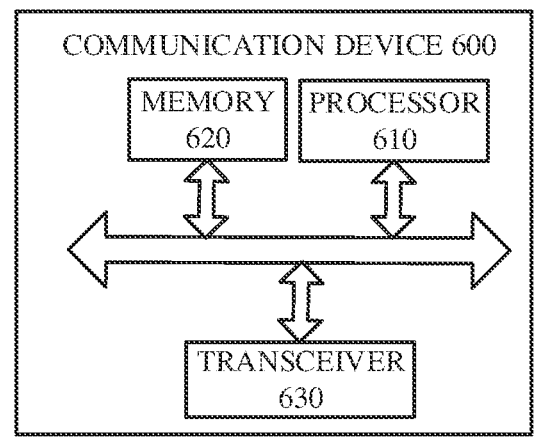
FIG. 15 is a schematic block diagram of a communication device provided in implementations of the disclosure.

FIG. 15 is a schematic structural diagram of a communication device 600 provided in implementations of the disclosure. The communication device 600 illustrated in FIG. 15 includes a processor 610. The processor 610 can invoke and execute computer programs stored in a memory, to perform the method in implementations of the disclosure.

Optionally, as illustrated in FIG. 15, the communication device 600 may further include the memory 620. The processor 610 can invoke and execute the computer programs stored in the memory 620, to perform the method in implementations of the disclosure.

The memory 620 may be a separate device independent of the processor 610, or may be integrated into the processor 610.

Optionally, as illustrated in FIG. 15, the communication device 600 can further include a transceiver 630. The processor 610 can control the transceiver 630 to communicate with other devices, specifically, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be operable as the network device in implementations of the disclosure, and the communication device 600 can implement the operations performed by the network device in various methods in implementations of the disclosure, which will not be repeated herein for the sake of simplicity.

Optionally, the communication device 600 may be operable as the mobile terminal the terminal device in implementations of the disclosure, and the communication device 600 can implement the operations performed by the mobile terminal/the terminal device in various methods in implementations of the disclosure, which will not be repeated herein for the sake of simplicity.

Figure 16:
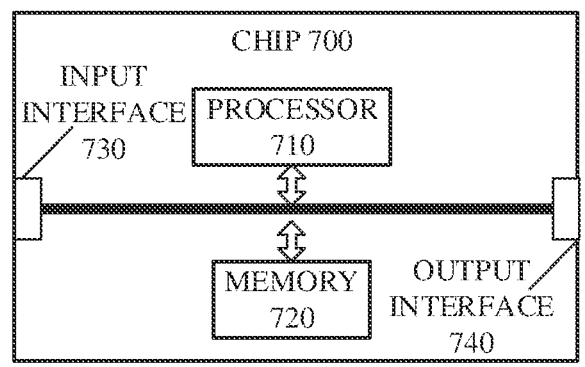
FIG. 16 is a schematic block diagram of a chip provided in implementations of the disclosure.

FIG. 16 is a schematic structural diagram of a chip according to implementations of the disclosure. The chip 700 illustrated in FIG. 16 includes a processor 710. The processor 710 can invoke and execute computer programs stored in a memory to perform the method in implementations of the disclosure.

Optionally, as illustrated in FIG. 16, the chip 700 further includes the memory 720. The processor 710 can invoke and execute the computer programs stored in the memory 720 to perform the method in implementations of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of simplicity.

Optionally, the chip is applicable to the mobile terminal/the terminal device in implementations of the disclosure. The chip can implement the operations performed by the mobile terminal/the terminal device in various methods in implementations in the disclosure, which will not be repeated herein for the sake of simplicity.

It should be understood that, the chip referred to in implementations of the disclosure may also be referred to as an SOC.

Figure 17:
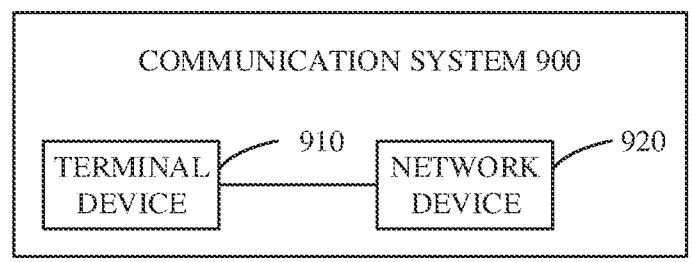
FIG. 17 is a schematic block diagram of a communication system provided in implementations of the disclosure.

FIG. 17 is a schematic block diagram of a communication system 900 provided in implementations of the disclosure.

As illustrated in FIG. 17, the communication system 900 includes a terminal device 910 and a network device 920.

The terminal device 910 can implement functions of the terminal device in the foregoing methods, and the network device 920 can implement functions of the network device in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced. SDRAM (ESDRAM), synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is it tended for illustration rather than limitation. For example, the memory in implementations of the disclosure may also be an SRAM, a DRAM, an SDRAM, a DDR SDRAM, an ESDRAM, arm SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the operations performed by the network device in various methods in implementations of the disclosure, which will not be repeated herein for the sake of simplicity.

Optionally, the computer program product is applicable to the mobile terminal/the terminal device of implementations of the disclosure. The computer program instructions are operable with a computer to implement the operations performed by the mobile terminal/the terminal device in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations perforated by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware, Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes in the foregoing method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that, contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments hut, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A network device, comprising:
a transceiver;
a processor; and
a memory configured to store computer programs which, when executed by the processor, cause the network device to:
receive at least one direct-current (DC) carrier location offset transmitted by a terminal device, each of the at least one DC carrier location offset indicating a frequency offset for a DC carrier location used by the terminal device relative to a reference DC carrier location; and
determine, according to the reference DC carrier location and the at least one DC carrier location offset, the DC carrier location used by the terminal device, wherein
the reference DC carrier location is determined according to a first carrier and a second carrier in a first carrier-set for the terminal device, the first carrier has a lowest frequency in the first carrier-set, and the second carrier has a highest frequency in the first carrier-set.

2. The network device of claim 1, wherein a plurality of carriers configured for the terminal device correspond to one transmit chain, a quantity of the reference DC carrier location is one, the at least one DC carrier location offset comprises one DC carrier location offset, and the reference DC carrier location and the DC carrier location offset are used for determining a DC carrier location for the transmit chain; or a plurality of carriers configured for the terminal device correspond to a plurality of transmit chains, a quantity of the reference DC carrier location is multiple, each of the plurality of transmit chains corresponds to one reference DC carrier location; the at least one DC carrier location offset comprises a plurality of DC carrier location offsets, each of the plurality of transmit chains corresponds to one DC carrier location offset; and for each of the plurality of transmit chains, a reference DC carrier location and a DC carrier location offset corresponding to the transmit chain are used for determining a DC carrier location for the transmit chain.

3. The network device of claim 1, wherein the reference DC carrier location is determined according to at least one of:

a frequency-band configuration for the terminal device, a carrier configuration for the terminal device, a bandwidth part (BWP) configuration for the terminal device, or an active-BWP configuration for the terminal device, wherein the frequency-band configuration is used for configuring an operation frequency-band for the terminal device, the carrier configuration is used for configuring a plurality of carriers in the operation frequency-band, the BWP configuration is used for configuring a plurality of BWPs on each of the plurality of carriers, and the active-BWP configuration is used for configuring an active BWP among the plurality of BWPs.

4. The network device of claim 1, wherein in terms of receiving at least one DC carrier location offset transmitted by the terminal device, the computer programs cause the network device to:

receive the at least one DC carrier location offset and first indication information transmitted by the terminal device, wherein the first indication information indicates the reference DC carrier location among a plurality of DC carrier locations.

5. The network device of claim 1, wherein the computer programs, when executed by the processor, further cause the network device to:

receive first capability information transmitted by the terminal device, wherein the first capability information indicates whether the terminal device supports DC carrier location reporting in carrier aggregation (CA), and the first capability information is transmitted in RRC signaling.

6. A terminal device, comprising:

a transceiver;

a processor; and a memory configured to store computer programs which, when executed by the processor, cause the terminal device to:

determine at least one direct-current (DC) carrier location offset, each of the at least one DC carrier location offset indicating a frequency offset for a DC carrier location used by the terminal device relative to a reference DC carrier location; and report the at least one DC carrier location offset to a network device, wherein the reference DC carrier location is determined according to a first carrier and a second carrier in a first carrier-set for the terminal device, the first carrier has a lowest frequency in the first carrier-set, and the second carrier has a highest frequency in the first carrier-set.

7. The terminal device of claim 6, wherein a plurality of carriers configured for the terminal device correspond to one transmit chain, a quantity of the reference DC carrier location is one, the at least one DC carrier location offset comprises one DC carrier location offset, and the reference DC carrier location and the DC carrier location offset are used for determining a DC carrier location for the transmit chain; or a plurality of carriers configured for the terminal device correspond to a plurality of transmit chains, a quantity of the reference DC carrier location is multiple, each of the plurality of transmit chains corresponds to one reference DC carrier location; the at least one DC carrier location offset comprises a plurality of DC carrier location offsets, each of the plurality of transmit chains corresponds to one DC carrier location offset; and for each of the plurality of transmit chains, a reference DC carrier location and a DC carrier location offset corresponding to the transmit chain are used for determining a DC carrier location for the transmit chain.

8. The terminal device of claim 6, wherein the reference DC carrier location is determined according to at least one of:

a frequency-band configuration for the terminal device, a carrier configuration for the terminal device, a bandwidth part (BWP) configuration for the terminal device, or an active-BWP configuration for the terminal device, wherein the frequency-band configuration is used for configuring an operation frequency-band for the terminal device, the carrier configuration is used for configuring a plurality of carriers in the operation frequency-band, the BWP configuration is used for configuring a plurality of BWPs on each of the plurality of carriers, and the active-BWP configuration is used for configuring an active BWP among the plurality of BWPs.

9. The terminal device of claim 6, wherein the first carrier-set comprises a plurality of uplink carriers configured by the network device; or the first carrier-set comprises a plurality of uplink carriers configured by the network device, and a plurality of downlink carriers configured by the network device; or the first carrier-set comprises a plurality of uplink carriers configured and activated by the network device, and a plurality of downlink carriers configured and activated by the network device.

10. The terminal device of claim 6, wherein in terms of reporting the at least one DC carrier location offset to the network device, the computer programs cause the terminal device to:

report the at least one DC carrier location offset and first indication information to the network device, wherein the first indication information indicates the reference DC carrier location among a plurality of DC carrier locations.

11. The terminal device of claim 6, wherein computer programs, when executed by the processor, further cause the terminal device to:
transmit first capability information to the network device, wherein the first capability information indicates whether the terminal device supports DC carrier location reporting in carrier aggregation (CA).

12. A method for direct-current (DC) carrier location reporting, comprising:
determining, by a terminal device, at least one DC carrier location offset, each of the at least one DC carrier location offset indicating a frequency offset for a DC carrier location used by the terminal device relative to a reference DC carrier location; and
reporting, by the terminal device, the at least one DC carrier location offset to a network device, wherein
the reference DC carrier location is determined according to a first carrier and a second carrier in a first carrier-set for the terminal device, the first carrier has a lowest frequency in the first carrier-set, and the second carrier has a highest frequency in the first carrier-set.

13. The method of claim 12, wherein
each of the at least one DC carrier location offset is a specific frequency-offset value; or
each of the at least one DC carrier location offset is a quantity of specific frequency intervals; or
each of the at least one DC carrier location offset is a quantity of subcarriers.

14. The method of claim 12, wherein the at least one DC carrier location offset is transmitted in at least one of: radio resource control (RRC) signaling, media access control (MAC) signaling, or a physical uplink control channel (PUCCH).

15. The method of claim 12, wherein
a plurality of carriers configured for the terminal device correspond to one transmit chain, a quantity of the reference DC carrier location is one, the at least one DC carrier location offset comprises one DC carrier location offset, and the reference DC carrier location and the DC carrier location offset are used for determining a DC carrier location for the transmit chain; or
a plurality of carriers configured for the terminal device correspond to a plurality of transmit chains, a quantity of the reference DC carrier location is multiple, each of the plurality of transmit chains corresponds to one reference DC carrier location; the at least one DC carrier location offset comprises a plurality of DC carrier location offsets, each of the plurality of transmit chains corresponds to one DC carrier location offset; and for each of the plurality of transmit chains, a reference DC carrier location and a DC carrier location offset corresponding to the transmit chain are used for determining a DC carrier location for the transmit chain.

16. The method of claim 12, wherein the reference DC carrier location is determined according to at least one of:
a frequency-band configuration for the terminal device, a carrier configuration for the terminal device, a bandwidth part (BWP) configuration for the terminal device, or an active-BWP configuration for the terminal device, wherein
the frequency-band configuration is used for configuring an operation frequency-band for the terminal device, the carrier configuration is used for configuring a plurality of carriers in the operation frequency-band, the BWP configuration is used for configuring a plurality of BWPs on each of the plurality of carriers, and the active-BWP configuration is used for configuring an active BWP among the plurality of BWPs.

17. The method of claim 12, wherein
the first carrier-set comprises a plurality of uplink carriers configured by the network device; or
the first carrier-set comprises a plurality of uplink carriers configured by the network device, and a plurality of downlink carriers configured by the network device; or
the first carrier-set comprises a plurality of uplink carriers configured and activated by the network device, and a plurality of downlink carriers configured and activated by the network device.

18. The method of claim 12, wherein the reference DC carrier location comprises at least one specific DC carrier location.

19. The method of claim 12, wherein reporting, by the terminal device, the at least one DC carrier location offset to the network device comprises:
reporting, by the terminal device, the at least one DC carrier location offset and first indication information to the network device, wherein the first indication information indicates the reference DC carrier location among a plurality of DC carrier locations.

20. The method of claim 12, further comprising:
transmitting, by the terminal device, first capability information to the network device, wherein the first capability information indicates whether the terminal device supports DC carrier location reporting in carrier aggregation (CA), wherein
the first capability information is transmitted in RRC signaling.

* * * * *